United States Patent [19]
Lloyd et al.

[11] Patent Number: 4,715,174
[45] Date of Patent: Dec. 29, 1987

[54] SNOW TRAP ATTACHMENT FOR CROP HARVESTING MACHINE

[76] Inventors: Mervin R. Lloyd, Box 55, D'Arcy, Sadkatchewan, Canada, S0L 0N0; Terrance A. Kon, Box 75, Brock, Saskatchewan, Canada, S0L 0H0

[21] Appl. No.: 831,818

[22] Filed: Feb. 24, 1986

[30] Foreign Application Priority Data

Mar. 19, 1985 [CA] Canada ................................. 476923

[51] Int. Cl.⁴ ..................... A01D 34/04; A01D 34/24
[52] U.S. Cl. ........................................ 56/297; 56/296; 56/238; 56/316; 56/189
[58] Field of Search ................... 56/2, 15.2, 296, 297, 56/315, 316, DIG. 2, 219, 238, 192, 123, 189, 259, 275

[56] References Cited

U.S. PATENT DOCUMENTS

| | | | |
|---|---|---|---|
| 1,284,037 | 11/1918 | Autt | 56/316 |
| 1,905,409 | 4/1933 | Innes | 56/238 |
| 2,401,513 | 6/1946 | Schimidt | 56/238 |
| 3,178,871 | 4/1965 | Nothnagel | 56/238 |
| 4,362,006 | 12/1982 | Deuzin | 56/238 |

FOREIGN PATENT DOCUMENTS

| | | |
|---|---|---|
| 328857 | 1/1930 | Canada . |
| 421751 | 3/1943 | Canada . |
| 2418995 | 11/1975 | Fed. Rep. of Germany ........ 56/238 |

OTHER PUBLICATIONS

Snow Management for Moisture Conservation—Paper No: 84-304 by Nicholaichuk/Dyck/Steppuhn.

*Primary Examiner*—John Weiss
*Attorney, Agent, or Firm*—Adrian D. Battison; Stanley G. Ade; Murray E. Thrift

[57] ABSTRACT

An attachment for forming standing straw snow traps comprises sickle blade, a curved guide and a support frame for mounting the attachment on the harvesting machine so that the sickle blade extends forwardly of, above and generally parallel to the machine's sickle blade over a short length thereof which is covered to prevent cutting of the crop. The attachment is connected to the reel arms of the machine for common height adjustment therewith. The curved guide directs the cut heads of the crop onto the collection draper of the machine. The attachment can be pivotaly mounted or mounted on scissors linkage from the cover.

20 Claims, 4 Drawing Figures

SNOW TRAP ATTACHMENT FOR CROP HARVESTING MACHINE

BACKGROUND OF THE INVENTION

This invention relates to a snow trap attachment for a crop harvesting machine. Such a harvesting machine can comprise either a conventional swather or a conventional combine harvester where the latter acts to cut and harvest the crop in one operation.

Conventional swathers or other harvesting machines generally include a transverse sickle blade for cutting the crop at a position closely adjacent to the ground so the straw and head drop onto a collection arrangement which can either be for example a draper or an auger screw.

In recent years experiments have been instituted with a view to improving the trapping of snow in the fields during the winter season so as to increase the amount of moisture available in the soil during the growing season. One proposal for trapping the snow has been to provide during harvesting relatively narrow snow trap strips of standing straw while the main portion of the field is cut in normal manner. These standing straw snow traps have been found to be effective in increasing the amount of snow retained on the field so that when the melt comes the moisture is retained in the soil over the field.

The experiments have, however, not reached a stage of commercial usage partly in view of the unavailability of suitable equipment to properly harvest the crop while leaving the standing straw snow trap.

One type of equipment which is available is a deflector which merely distorts or bends the straw as it is cut by the machine so that only the heads are cut off. However this leaves the straw badly damaged and can interfere with harvesting.

SUMMARY OF THE INVENTION

Accordingly it is one object of the present invention to provide an attachment for a crop harvesting machine which enables the formation of a standing strip of straw while continuing to properly harvest the crop.

The invention therefore provides an attachment for a crop harvesting machine of the type having a transverse blade arrangement across the front harvesting section for cutting the crop and collection means onto which the cut crop is deposited for condensing, the attachment comprising a blade arrangement for cutting the crop, means for driving the blade arrangement, the blade arrangement having a length which is a minor proportion of the length of the blade arrangement of the machine and means for mounting the attachment on the machine with the blade arrangement thereof at a position above and parallel of the machine blade arrangement whereby, with a section of the machine blade arrangement underlying the attachment prevented from cutting the crop, the attachment acts to cut the crop at a higher level than the machine blade arrangement to leave a strip of standing straw and to deposit the cut crop therefrom onto the collection means.

Preferably the attachment includes a cover arrangement which fits over the conventional sickle blade of the machine to prevent cutting action of that section of the blade. The attachment can then provide a subsidiary sickle blade forwardly and upwardly of the cover for engaging the crop prior to the cover to cut the crop just below the head. A curved guide plate can be positioned rearwardly of the sickle blade to guide the material from the blade to the conventional draper of the swather preferably toward the back so that it is deposited on top of the swather in the field or other collection arrangement.

In accordance an important subsidiary feature of the invention, the attachment is operatively connected to the conventional reel of the harvesting machine so that adjustment of the height of the reel in conventional manner to accommodate the height of the crop also automatically adjusts the height of the sickel blade to cut the crop at the required level.

In one example the sickle blade of the attachment is cantilevered from a support frame at one end of the harvesting machine. In another arrangement the sickle blade of the attachment is supported by a scissors frame from a cover section over the machine's sickle blade at any position across the harvesting machine.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
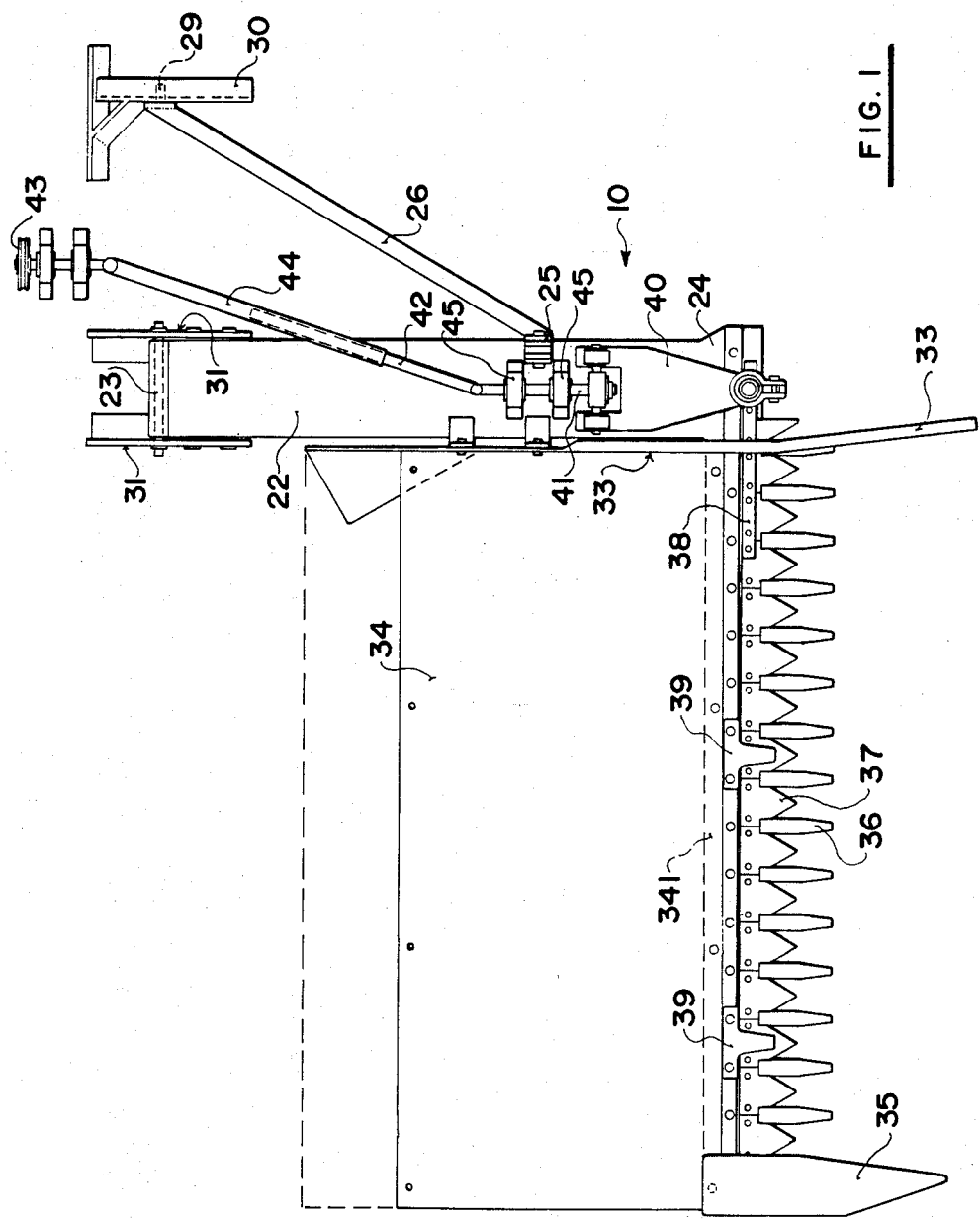
FIG. 1 is a plan view of an attachment according to the invention with most of the parts of the swather omitted for convenience of illustration.
Figure 2:
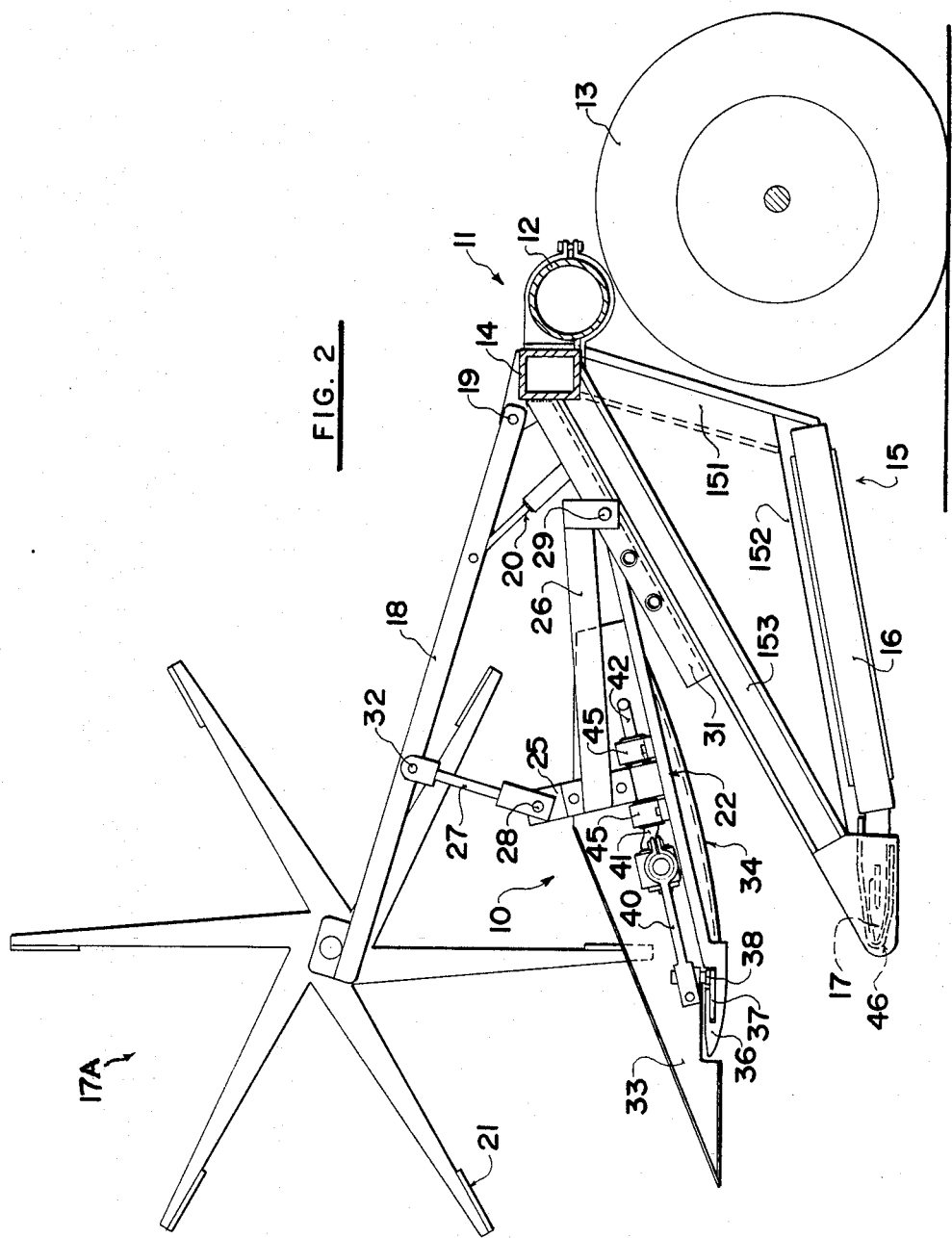
FIG. 2 is a side elevational view of the attachment of FIG. 1 when attached to the swather.

Referring firstly to FIGS. 1 and 2 there is shown an attachment generally indicated at 10 arranged for attachment to a conventional swather indicated generally at 11.

The swather 11 comprises one example only of a conventional swather and it will be appreciated that there are various different designs of self-propelled or pull-type swathers and that the attachment 10 can be modified where necessary to accommodate the slightly varying designs.

Generally, however, the swather comprises a main beam 12 supported on a pair of ground wheels one of which is indicated at 13. The main beam 12 is attached to a suitable hitch mechanism for towing by a tractor in conventional arrangement.

The main beam 12 supports a subsidiary beam 14 which in turn carries a swather frame generally indicated at 15 comprising a downwardly depending strut 151, a substantially horizontal frame section 152 and an incline strut 153 completing a triangle for supporting the substantially horizontal frame section 152 in a position forwardly projecting from the beam 14. The frame section 152 carries draper rollers 16 supporting draper on belt for transporting crop sidewardly of the swather that is longitudinally of the beam 14 to an opening where the material can be deposited from the swather to form a narrow swath. The opening in some cases is positioned at one end and in other cases centrally of the swather whereupon the draper is formed into two separate parts leading towards the central opening.

Forwardly of the draper support rollers 16 is a sickle knife generally indicated at 17 again a conventional structure comprising stationary blades and a longitudinally reciprocating blade arrangement which acts to cut the crop at a position adjacent to the ground so that if falls onto the draper for transporting to the swath opening.

The conventional swather also incorporates a reel generally indicated at 17A mounted upon reel support arms 18 pivotally mounted at 19 on the main beam 14. The reel in conventional manner rotates in an anti-clockwise direction as shown in FIG. 2 to assist in controlling the movement of the crop onto the draper from the sickel blade 17. The height of the reel 17A is controlled by a hydraulic cylinder 20 and is adjusted in accordance with the height of the standing crop to obtain the desired movement of the crop onto the draper. In general practice the reel 17A is adjusted so that the paddles 21 which extend longitudinally of the swather strike the crop at or just below the upper end so that it is directed onto the draper.

The attachment 10 is arranged for mounting on the swather adjacent the hitch end thereof. The attachment includes a main support beam 22 in the form of a flat strap carrying a hinge 23 at a rearward end and extending forwardly therefrom to a front support portion indicated at 24. The flat strap carries an upstanding bracket 25 on one side at a position intermediate to length thereof. The bracket is firstly attached to a rigid support strut 26 which extends rearwardly and outwardly therefrom at an angle to the beam 22. A hanging link 27 is attached to the top of the brakcet 25 by way of a pivot coupling 28.

As shown best in FIG. 2, the strut 26 is pivotly coupled by a hinge 29 at the rearward end thereof to a bracket 30 attached to the swather so that the hinge 29 is aligned with the hinge 23 to allow the beam 22 to pivot upwardly and downwardly relative to the hinges 23 and 29 which are also spaced longitudinally of the swather to prevent twisting of the beam 22. The position hinges 23 and 29 can be moved forwardly and rearwardly on a bracket 31 and the bracket 30 respectively so as to move forwardly and rearwardly the front end 24 of the beam 22.

The hanging link 27 is attached by a pivot coupling 32 to the reel support arm 18 so that the beam 22 is pivotal with the reel upwardly and downwardly on the hinges 23 and 29.

The beam 22 supports an upstanding guide plate 33 lying generally a right angles to the beam 22 and projecting into a forward guide nose beyond the forward end of the portion 24. The beam 22 and guide 33 also support a curved transverse guide sheet 34 which is cantilevered outwardly from the beam 22 on a frame strut 341 to a remote end which supports a further guide 35 parallel to the nose to define a cutting area between the nose and the guide. The sheet 34 carries at a front edge a plurality of cutting guides 36 projecting forwardly from the sheet so as to direct the crop between the guides or fingers 36 to a blade 37. The blade 37 carries a plurality of teeth so that when reciprocated longitudinally by a drive bar 38 the teeth act to cut the crop between the fingers 36. The teeth form part of the continuous blade 37 which is guided in its movement by over laying tabs 39 carried on a forward edge of the sheet 34.

The movement of the blade 37 can be obtained by any suitable mechanism but in the embodiment illustrated in FIG. 1 this comprises a pitman 40 which is reciprocated by an eccentric or nobble shaft 41 driven by a shaft 42 from a pulley 43 taking drive from the swather by conventional means (not shown). The shaft 42 includes an extendable section 44 and is mounted in bearings 45 on the strap 22 so as to hold the shaft 44 whereby rotation of the eccentric causes the necessary driving motion of the teeth 37.

The attachment also comprises a shield 46 which is positioned over the sickle blade 17 along an extent of the blade substantially equal to the distance between the guides 33, 35. In practice, the shield is generally about three inches less than the blade to ensure a slight overlap in cutting to avoid any uncut strip.

In operation, the shield 46 prevents the sickle blade 17 from cutting the crop over a portion of the swather width equal to the width of the attachment. Over this width, as shown in FIG. 2, the crop is engaged prior to the shield 46 by the blade 37 so that the crop is cut at a higher level than the blade 17 by the blade 37 following which the upper cut portion of the crop is swept over the curved sheet 34 onto the draper.

The height of the blade 37 is adjusted directly in connection with the adjustment of the reel 17A. Initially the position of the blade 37 relative to the reel 17A can be set in accordance with the requirement by varying the length of the bracket 27 and the position of the pivot 32 on the arm 18 to set the position of the teeth 37 relative to the paddles 21. Subsequently when the conventional adjustment of the height of the reel 17A is made relative to the crop generally so that the paddles 21 just strike the heads, the blade 37 is automatically adjusted to a position just beneath the heads so as to leave as tall as possible standing straw after the heads have been severed for harvesting.

It will be appreciated that the attachment is positioned within the normal working width of the swather and acts to drop the material directly onto the conventional draper of the swather with the heads being properly swept over the sheet 34 into the correct position on the draper for deposit onto the swath. In particular, the sheet 34 gudies the heads to the rear of the draper so that when deposited from the end they tend to land on top of the swath. Thus, the straw that engages the shield 46 has already been harvested and is merely bent over by the shield 46 without any further cutting so it can readily revert to its standing position after the shield and raper have passed over the straw.

Figure 3:
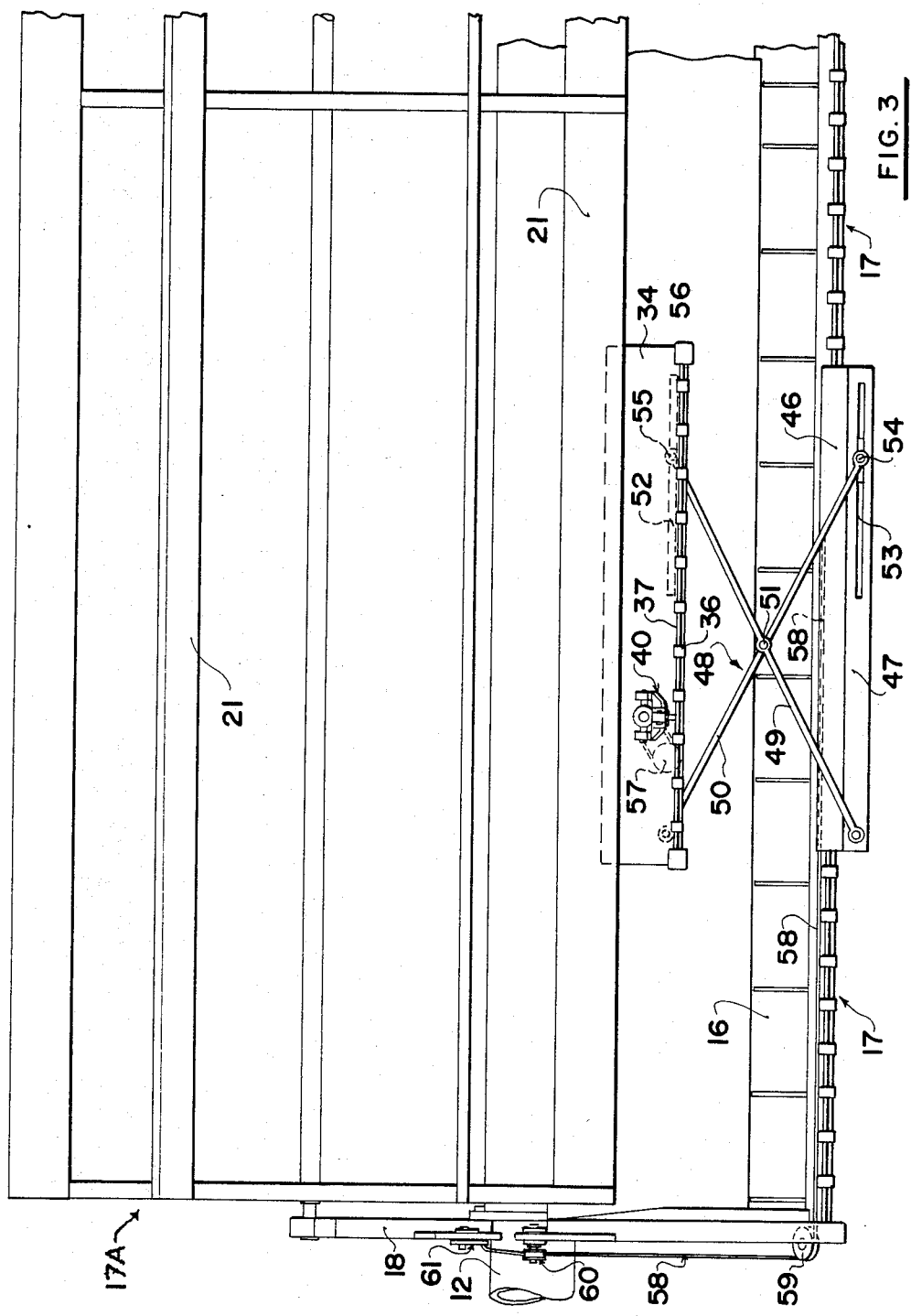
FIG. 3 is a front elevational view of a second embodiment of attachment according to the invention mounted on a swather.
Figure 4:
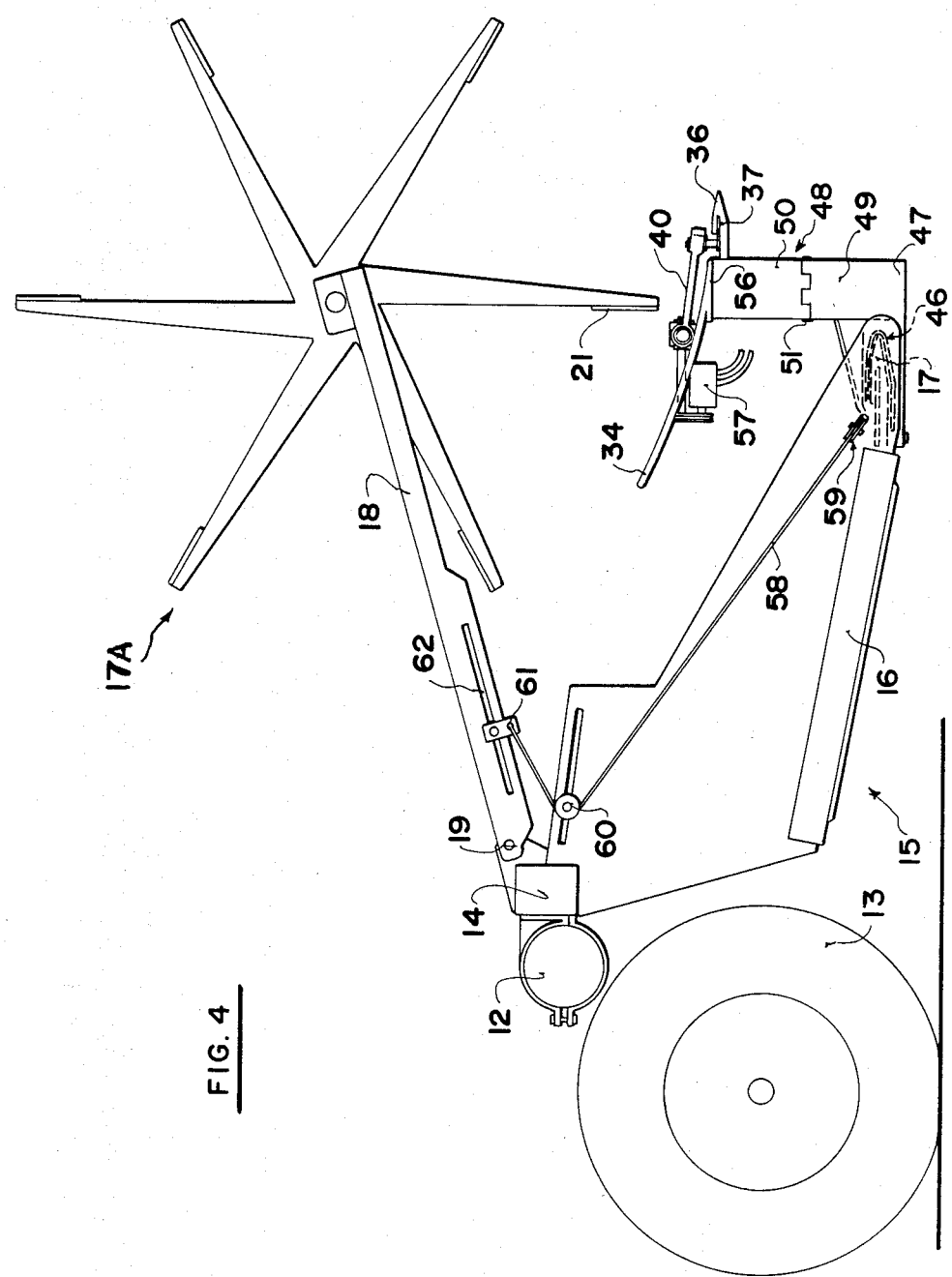
FIG. 4 is a side elevational view of the attachment and swather of FIG. 3.

Turning now to FIGS. 3 and 4 there is provided a modified arrangement which carries out substantially the same function as previously described. In this case, the blade 37 of the attachment is positioned intermediate the length of the swather rather than at one end as in the previous embodiment. Furthermore in this case the attachment is mounted basically on the shield 46 so as to stand up therefrom. Thus the shield 46 carries a bracket 47 carrying a scissors lift mechanism generally indicated at 48. The mechanism 48 comprises a pair of levers 49 and 50 arranged at an angle and crossing at a mid point indicated at 51 at which they are pivotally coupled by a hinge mechanism. One end of each of the levers 49, 50 is mounted in a slide 52, 53 respectively. Thus the slide 53 is mounted on the bracket 47 and engages an end pin 54 of the lever 50. Similarly a pin 55 of the lever 49 slids in the slide 52 of a support plate 56 carrying the curbed sheet 34.

For convenience of drive, the blade 37 is driven in this case by a hydraulic motor 57 which is thus free from direct mechanical linkage to the drive mechanism at the beam 12.

The height of the balde 37 relative to the shield 46 is adjusted by a cable 58 attached to the lever 50 of the scissors lift 48 so as to draw the slide pin 54 along the slide 53 to raise and lower the blade 37. The cable 58 passes round pulleys 59, 60 and is attached to a brakcet 61 on the lift arm 18 of the reel 17A. The position of the bracket 61 can be adjusted in a slot 62 so that lifting movement of the reel 17A directly acts to release and withdraw the cable 58 to obtain a corresponding lifting and lowering movement of the sickle blade 37.

It will be appreciated that though described in conjunction with a swather, it is possible for the attachment to be modified in a manner that will be apparent to one skilled in the art for attachment to the head of a combine in cases where direct harvesting of the crop is possible.

Since various modifications can be made in my invention as hereinabove described, and many apparently widely different embodiments of same made within the spirit and scope of the clains without departing from such spirit and scope, it is intended that all matter contained in the accompanying specification shall be interpreted as illustrative only and not in a limiting sense.

We claim:

1. An attachment for a crop harvesting machine of the type having a transverse machine blade arrangement across the front harvesting section for cutting the crop and collection means onto which the cut crop is deposited for condensing, the attachment comprising an attachment blade arrangement for cutting the crop, means for driving the attachment blade arrangement, the attachment blade arrangement having a length which is a minor proportion of the length of the machine blade arrangement of the machine and means for mounting the attachment thereof at a position above and parallel to said machine blade arrangment whereby, with the machine blade arrangment arranged not to cut the crop at a position directly underlying the attachment, the attachment acts to cut the crop at a higher level than the machine blade arrangement to leave a strip of standing straw and to deposit the cut crop therefrom onto the collection means.

2. The invention according to claim 1 including cover means for covering the section of the machine blade arrangement for preventing the cutting action thereof on the crop contacting the section.

3. The invention according to claim 1 wherein the attachment blade arrangement comprises a sickel blade and wherein said drive means is arranged to reciprocate said sickle blade longitudinally thereof to cut the crop.

4. The invention according to claim 1 including a guide plate rearwardly of the attachment blade arrangement for guiding the crop onto the collection means.

5. The invention according to claim 4 wherein the guide plate is curved rearwardly and upwardly.

6. The invention according to claim 1 wherein the mounting means is arranged to mount the attachment blade arrangement forwardly of the section of the machine blade arrangement.

7. An attachment for a crop harvesting machine of the type having a transverse machine blade arrangement across the front harvesting section for cutting the crop and collection means onto which the cut crop is deposited for condensing, the attachment comprsing an attachment blade arrangement for cutting the crop, means for driving the attachment blade arrangement having a length which is a minor proportion of the length of the machine blade arrangement of the machine and means for mounting the attachment on the machine with the attachment blade arrangement thereof at a position above and parallel to said machine blade arrangment whereby, with the machine blade arrangement arranged not to cut the crop at a position directly underlying the attachment, the attachment acts to cut the crop at a higher level than the machine blade arrangement to leave a strip of standing straw and to deposit the cut crop therefrom onto the collection means, wherien the machine includes a reel, reel support arms and means for adjusting the height thereof and wherein the attachment includes means operatively connecting the attachment to the reel whereby the height of the attachment blade arrangement is adjusted commonly with the adjustment of the height of the reel.

8. An attachment for a crop harvesting machine of the type having a transverse machine blade arrangement across the front harvesting section for cutting the crop and collection means onto which the cut crop is deposited for condensing, the attachment comprising an attachment blade arrangement for cutting the crop, means for driving the attachment blade arrangement, the attachment blade arrangement having a length which is a minor proportion of the length of the machine blade arrangement of the machine and means for mounting the attachment on the machine with the attachment blade arrangement thereof at a position above and parallel to said machine blade arrangement whereby, with the machine blade arrangement arranged not to cut the crop at a position directly underlying the attachment, the attachment acts to cut the crop at a higher level than the machine blade arrangement to leave a strip of standing straw and to deposit the cut crop therefrom onto the collection means, wherein the attachment includes a support frame having hinge means at a rearward end thereof for pivotal mounting on the machine at a position rearwardly of the attachment blade arrangement and means for raising and lowering said attachment blade arrangement.

9. The invention according to claim 8 wherein the machine includes a reel, reel support arms and means for adjusting the height thereof and wherein the attachment includes linkage means attaching said support frame to one of said reel arms for common adjustment of the height thereof.

10. The invention according to claim 8 wherein the support frame is arranged at one end of the machine and the attachment blade arrangement thereof is cantilevered from said support frame.

11. An attachment for a crop harvesting machine of the type having a transverse machine blade arrangement across the front harvesting section for cutting the crop and collection means onto which the cut crop is deposited for condensing, the attachment comprising an attachment blade arrangement for cutting the crop, means for driving the attachment blade arrangement the attachment blade arrangement having a length which is a minor proportion of the length of the machine blade arrangement of the machine and means for mounting the attachment on the machine with the attachment blade arrangement thereof at a position above and parallel to said machine blade arrangement whereby, with the machine blade arrangement arranged not to cut the crop at a position directly underlying the attachment, the attachment acts to cut the crop at a higher level than the machine blade arrangement to leave a strip of standing straw and to deposit the cut crop therefrom onto the collection means, including cover means for covering the section of the machine blade arrangement for preventing cutting action thereof, said mounting means being arranged to mount said attachment blade arrangement on said cover means for supporting said attachment blade arrangement in a position upwardly of said cover means.

12. The invention according to claim 11 wherein said mounting means comprises a scissors frame arranged to adjust the height of the attachment blade arrangement relative to the cover means.

13. The invention according to claim 12 wherein said machine includes reel, reel support arms and means for adjusting the height thereof and wherein the attachment includes means operatively interconnecting said scissors frame and the reel for common height adjustment thereof.

14. A crop harvesting machine of the type having a trasnverse machine blade arrangement across the front harvesting section for cutting the crop, collection means onto which the cut crop is deposited for condensing, a subsidiary blade arrangement for cutting the crop, having a length which is a minor proportion of the length of the machine blade arrangement, means for driving the subsidiary blade arrangement, and means mounting the subsidiary blade arrangement at a position above and parallel to said machine blade arrangement whereby, with the machine blade arrangement arranged not to cut the crop at a position directly underlying the subsidiary blade arrangement, the subsidiary blade arrangement acts to cut the crop at a higher level than the machine blade arrangement to leave a strip of standing straw and to deposit the cut crop therefrom onto the collection means.

15. The inventiona ccording to claim 14 including cover means for covering the section of the machine blade arrangement for preventing the cutting action thereof on the crop contacting the section.

16. The invention according to claim 14 wherein the subsidiary blade arrangement comprises a sickle blade and wherein said drive means is arranged to reciprocate said sickle blade longitudinally thereof to cut the crop.

17. The invention according to claim 14 including a guide plate rearwardly of the subsidiary blade arrangement for guiding the crop onto the collection means.

18. The invention according to claim 17 wherein the guide plate is curved rearwardly and upwardly.

19. The invention according to claim 14 wherein the mounting means is arranged to mount the subsidiary blade arrangement forwardly of the section of the machine blade arrangement.

20. A crop harvesting machine of the type having a transverse machine blade arrangement across the front harvesting section for cutting the crop, collection means onto which the cut crop is deposited for condensing, a subsidiary blade arrangement for cutting the crop, having a length which is a minor proportion of the length of the machine blade arrangement, means for driving the subsidiary blade arrangement, and means mounting the subsidiary blade arrangement at a position above and parallel to said machine blade arrangement whereby, with the machine blade arrangement arranged not to cut the crop at a position directly underlying the subsidiary blade arrangement, the subsidiary blade arrangement acts to cut the crop at a higher level than the machine blade arrangement to leave a strip of standing straw and to deposit the cut crop therefrom onto the collection means, wherein the machine includes a reel, reel support arms, means for adjusting the height thereof and means operatively connecting the subsidiary blade arrangement to the reel whereby the height thereof is adjusted commonly with the adjustment of the height of the reel.

* * * * *